United States Patent
DeJarnett et al.

(10) Patent No.: US 12,210,868 B2
(45) Date of Patent: Jan. 28, 2025

(54) CONTEXTUAL APPLICATION DELIVERY

(71) Applicant: Omnissa, LLC, Mountain View, CA (US)

(72) Inventors: Steven DeJarnett, San Jose, CA (US); Peter Björk, Ekerö (SE); Martin Kniffin, Atlanta, GA (US); Frank Stephen Taylor, Hertfordshire (GB)

(73) Assignee: Omnissa, LLC, Mountain View, CA (US)

( * ) Notice: Subject to any disclaimer, the term of this patent is extended or adjusted under 35 U.S.C. 154(b) by 110 days.

(21) Appl. No.: 17/978,604

(22) Filed: Nov. 1, 2022

(65) Prior Publication Data

US 2024/0143319 A1  May 2, 2024

(51) Int. Cl.
*G06F 8/71* (2018.01)
*G06F 8/61* (2018.01)

(52) U.S. Cl.
CPC . *G06F 8/71* (2013.01); *G06F 8/61* (2013.01)

(58) Field of Classification Search
CPC .................................... G06F 8/71; G06F 8/61
See application file for complete search history.

(56) References Cited

U.S. PATENT DOCUMENTS

| | | | |
|---|---|---|---|
| 11,061,667 B1* | 7/2021 | Gujarathi | G06F 8/71 |
| 2014/0007182 A1* | 1/2014 | Qureshi | G06F 8/53 |
| | | | 726/1 |
| 2014/0215555 A1* | 7/2014 | Barton | G06F 9/45533 |
| | | | 726/1 |
| 2020/0241865 A1* | 7/2020 | Phong | G06F 8/71 |

* cited by examiner

*Primary Examiner* — Wei Y Zhen
*Assistant Examiner* — Brahim Bourzik
(74) *Attorney, Agent, or Firm* — Kim & Stewart LLP

(57) ABSTRACT

Disclosed are various approaches for determining a version of an application for a user to access based at least in part an overall posture of the user and the device launching the application. An application can support multiple delivery mechanisms to allow a user different ways to access the service provided by the application. A posture level (e.g., level of risk, level of compliance) associated with the overall posture of a device and user accessing an application is determined. The posture level can be used to select which version of the application should be launched by the device in order to provide the best experience for the user while ensuring that security is considered.

18 Claims, 3 Drawing Sheets

CONTEXTUAL APPLICATION DELIVERY

BACKGROUND

Many applications support multiple delivery mechanisms to allow a user different ways to access the service provided by the application. For example, an application can be launched as a web version, a native version, or a virtualized version. Each version can provide varying levels of functionality and access to a user interacting with the application. For example, a web version or a native version of an application may provide functionality that is greater than the functionality of a virtualized version that provides fewer or limited features. In some situations, a device posture of a given device (e.g., device location, device configurations, etc.) and/or a user posture of a user interacting with the device (e.g., a role of a user, an organization of the user, changes in observed behavior of the user, access permissions assigned to the user, etc.) may affect the security of the data being accessed. Typically, if an overall posture fails to Accordingly, in order to ensure the security and reliability of the data or services accessed by a given application, a managed or monitored device can be restricted or otherwise denied from launching an application if the device posture and/or user posture fail to meet certain requirements for accessing the data provided by the application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
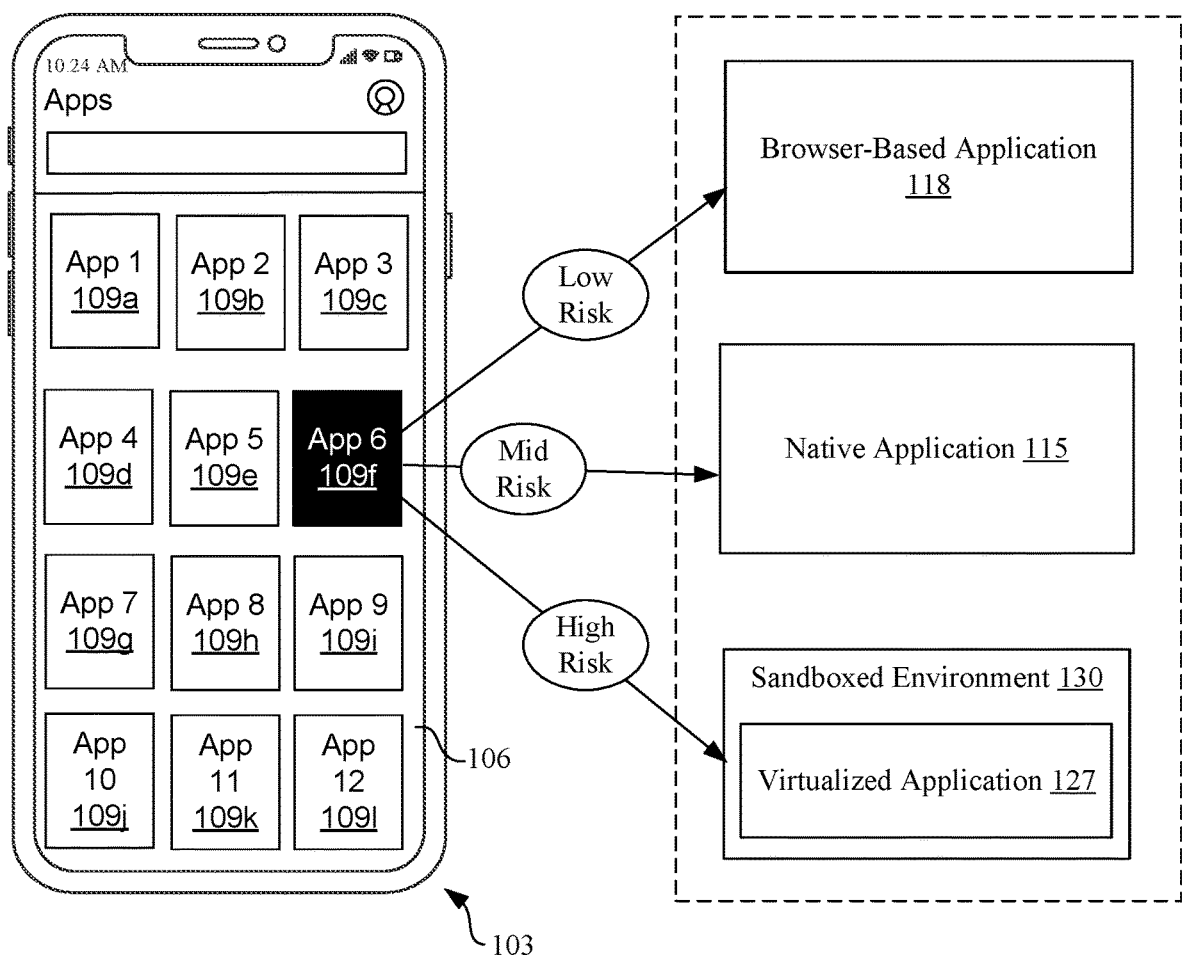
FIG. 1. illustrates an example scenario associated with a user selecting a selectable component associated with an application having multiple versions that are available to the user and a version being selected to launch based at least in part on an overall posture associated with the device, the user, and/or other factors.

The present disclosure relates to determining a version of an application for a user to access based at least in part an overall posture of the user and the device launching the application. In various examples, an application can support multiple delivery mechanisms to allow a user different ways to access the service provided by the application. For example, an application can be launched as a web version, a native version, or a virtualized version. Each version can provide varying levels of functionality and access to a user interacting with the application. For example, a web version of the application can provide full functionality and data access associated with the application whereas a native application or a virtualized application can provide more limited functionality and data access. Likewise, in other examples, the native application may provide full functionality and data access whereas a web version may provide a more limited functionality and data access. According to various embodiments, a posture level (e.g., level of risk, compliance, etc.) associated with an application launch request is determined based at least in part on the overall posture of a device and user requesting to launch the application. The posture level can be used to select which version of the application should be launched by the device in order to provide the best experience for the user while ensuring that security is considered.

In various examples, the overall posture associated with a request to launch an application can be based at least in part on user data, device data, session data, and/or other types of data. For example, the user data can include a user job profile, an organization group, user permissions for accessing data, an organization title, changes in observed behavior of the user, type of user authentication, strength of user authentication, risk flags assigned to the user, and/or other data. The device data can include, for example, a device location (e.g., physical and/or logical), a device management status, an operating system version, one or more device security settings, a device type, a device status, a list of installed applications, a type of network connection associated with the client device and/or other data. In some examples, the session data can include a time of day, a day of a week, a type of application being requested to launch, a type of network connection, a network status, and/or other features. In some examples, the overall posture can further be based on other features such as for example, known risks associated with the client device 103 and/or the operating system version, known and/or current cyber security threat levels, an IP address reputation, a location risk, any issues associated with adjacent sessions associated with the user and/or device, and/or other features.

In various examples, the overall device posture of the device requesting to launch the application can be analyzed to determine a level of risk or a level of trust associated with launching the application. Based on the determined level or risk and the access features associated with the different versions of the application, a version of the application can be selected from different versions (e.g., delivery mechanisms) of the application. Accordingly, when a user requests to launch a given application on his or her device, the version (e.g., delivery mechanism) of the application that is selected for the given overall posture of the device and/or user is launched without requiring the user to guess which application version (e.g., delivery mechanism) is appropriate or otherwise secure for a given situation or context.

Turning now to FIG. 1, shown is an example scenario 100 illustrating the user experience when requesting to launch an application on a client device 103. In particular, a user interface 106 rendered on a client device 103 can include one or more selectable components 109 (e.g., 109a . . . 109l) representing applications that can be launched by the client device 103. For example, a selection of a particular selectable component 109 by a user interacting with the client device 103 can cause the application to be launched by the client device 103, thereby allowing the user to interact with the services and/or data provided by the application.

In the example of FIG. 1, the user has selected the selectable component 109f for a given application. Typically, upon selection of the selectable component 109f, the client application would proceed with launching a particular application version 112 associated with the selectable component 109f. For example, the selectable component 109f could correspond to an installed native application 115 that is locally installed on the client device 103. In another example, the selectable component 109f could correspond to a browser-based application 118 that is accessed by launching a browser 121 (FIG. 2) executed by the client device 103. However, according to various examples of the present disclosure, when a user selects on the selectable component 109f, regardless of whether it is directed towards a specific version of the application, the client device 103 can send an application selection request to an application selection service 124 (FIG. 2) which can determine a level or risk or a level of trust associated with the client device 103 and select a version of an application to launch based at least in part on the determined posture level (e.g., level of risk, level of trust, level of compliance, etc.).

In various examples, an application can support multiple delivery mechanisms (e.g., different versions) to allow a user different ways to access the service provided by the application. For example, an application can be launched as a browser-based application 118, a native application 115, or a virtualized application 127. Each version can provide varying levels of functionality and access to a user interacting with the application. For example, the browser-based application 118 can correspond to an application that is accessed through the use of a browser 121 (FIG. 2) executed by the client device 103. In various examples, the browser-based application 118 can provide the full functionality of the service, including, for example, access to administrative features to the user based on their authorization. The native application 115 can correspond to an application that is installed on the client device 103 by the user or the enterprise. In various examples, the native application 115 can be written in code that runs natively on the client device 103 and provides the majority of the features of the service to the user, but not all the features that are provided by the browser-based application 118. In other examples, the native application 115 may provide full functionality of the service whereas the browser-based application 118 may provide a limited level of functionality than provided by the native application 115. In another example, a virtualized application 127 can correspond to the application being executed in a sandboxed environment 130 where execution is observed by an outside process or system to detect any malicious or undesirable activity. In other examples, a virtualized application 127 can correspond to a virtual device or virtual desktop environment that executes the application on a different system, but does not overt effort to observe the execution of the application to detect malicious or undesirable activity. In this version, the user can be provided a more-limited application access experience than with the native application 115 or the browser-based application 118. For example, in the virtualized application 127, limits can be placed on the privileges the user has available to the user during the application session. For example, a user may be prevented from taking screenshots and/or copying or editing data provided by the service provided by the application. It should be noted that the levels of functionality discussed with respect to the different types of delivery mechanisms can vary from what is discussed and that the virtualized application 127 is not limited to the having the most limiting level of functionality and the browser-based application 118 is not limited to providing full functionality of the service.

In various examples, upon receiving an application selection request, the application selection service 124 can determine the overall posture or context of the device 103 (e.g., level of trust, level of risk, etc.) based at least in part on user data 133 (FIG. 2), device data 136 (FIG. 2), session data 139 (FIG. 2), and/or other types of data. For example, the user data 133 can include a user job profile, an organization group, user permissions for accessing data, an organization title, changes in observed behavior of the user, type of user authentication, strength of user authentication, and/or other data. The device data 136 can include, for example, a device location (e.g., physical, logical), a device management status, an operating system version, one or more device security settings, a device type, a device status, a list of installed applications, a type of network connection associated with the client device and/or other data. In some examples, the session data 139 can include a time of day, a day of a week, a type of application being requested to launch, a type of network connection, a network status, and/or other features.

In various examples, the user data 133, the device data 136, and/or the session data 139 can be obtained by querying the client device 103. In some examples, the client device 103 is a managed device of an enterprise, and a telemetry agent (e.g., telemetry component 221 (FIG. 2)) installed on the client device 103 can collect and provide the user data 133, the device data 136, and/or the session data 139 to the application selection service 124. In other examples, the user data 133, the device data 136, and/or the session data 139 are stored in a data store 141 (FIG. 2) associated with the enterprise and are obtained by accessing the data store 141.

According to various examples, the application selection service 124 determines the posture level and selects an appropriate version of the application for the client device 103 to launch based at least in part on the posture level. In some examples, the level of risk is based on a score that is generated to reflect the posture level (e.g., a sum of weights assigned to factors associated with the user data, device data, and/or session data). In this example, a version of the application may be selected when the score is within a predefined threshold range assigned to a given version. In other examples, a version of the application is selected based at least in part on an explicit presence or absence of context attributes. For example, if a firewall is enabled for the device and the device is a managed device, the level or risk may be less than if the device does not have a firewall enabled or the device is unmanaged. As such, the version of the application is selected based at least in part on whether certain attributes are present.

Upon determining a version of the application to launch, the application selection service 124 can notify the client device 103 and the client device 103 can proceed with launching the selected version of the application. In various examples, the user may be notified why a particular version of an application was launched. In some examples, the notification may indicate certain features that can be enabled to allow the user to access a less limiting version of the application. For example, if the firewall is not enabled and the user is provided with the virtualized application 127, the notification may indicate that the user could access the native application 115 and/or the browser-based application 118 if the firewall were enabled.

Figure 2:
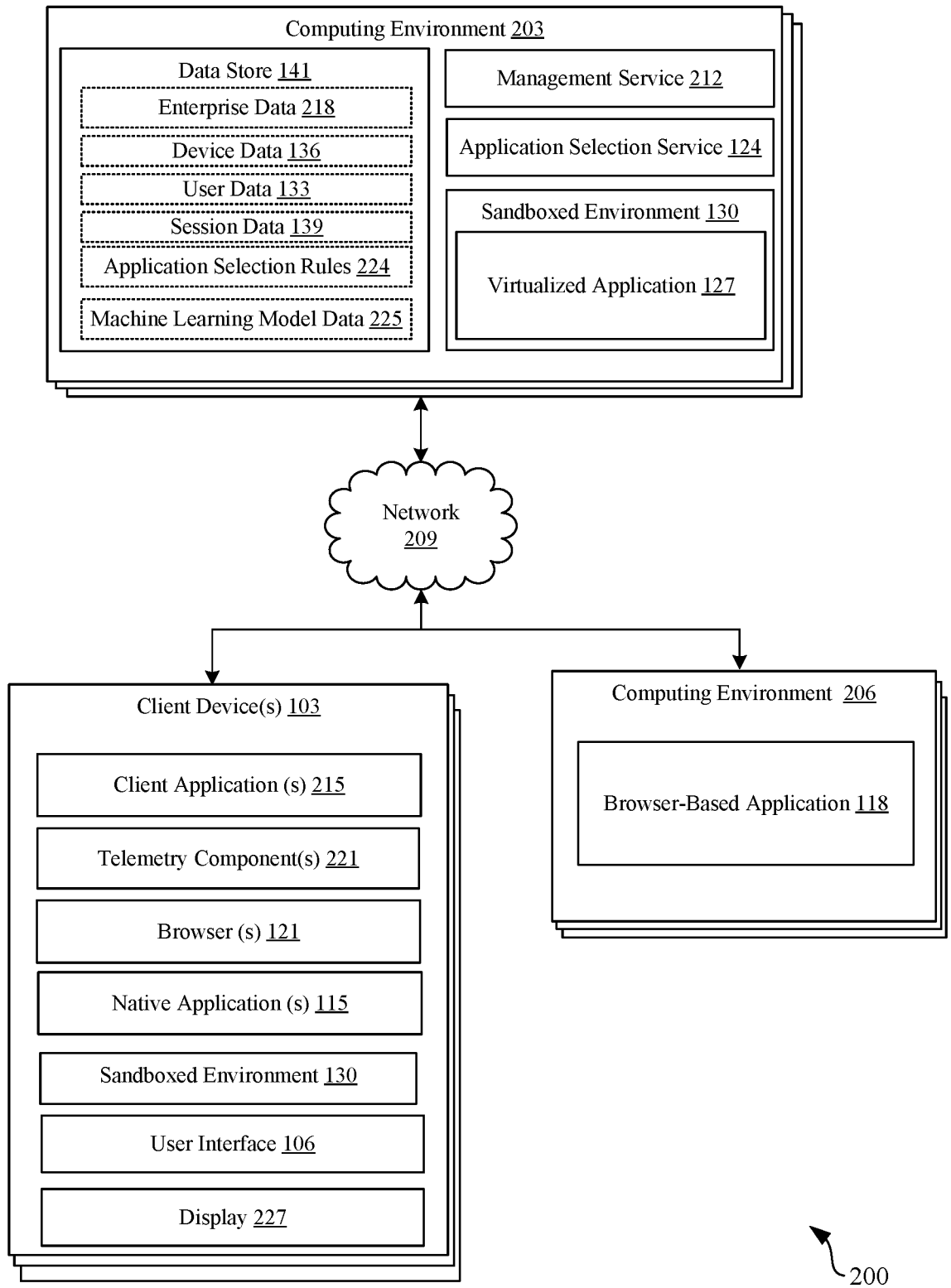
FIG. 2 is a schematic block diagram depicting an example of a network environment.

Moving on to FIG. 2, shown is an example of a network environment 200. The network environment 200 includes a computing environment 203, a computing environment 206 and a client device 103 which are in data communication with each other across a network 209. The network 209 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include, for example, a server computer or any other system providing computing capability. Alternatively, the computing environment 203 can include a plurality of computing devices that are arranged, for example, in one or more server banks, computer banks, or other arrangements. The computing environment 203 can include a grid computing resource or any other distributed computing arrangement. The computing devices can be located in a single installation or can be distributed among many different geographical locations. The computing environment 203 can also include or be operated as one or more virtualized computer instances. For purposes of convenience, the computing environment 203 is referred to herein in the singular. Even though the computing environment 203 is referred to in the singular, it is understood that a plurality of computing environments 203 can be employed in the various arrangements as described above. As the computing environment 203 communicates with the client devices 103 remotely over the network 209, the computing environment 203 can be described as a "remote" or "cloud" computing environment 203.

The computing environment 203 can include a data store 141. The data store 141 can include memory of the computing environment 203, mass storage resources of the computing environment 203, or any other storage resources on which data can be stored by the computing environment 203. The data stored in the data store 141, for example, can be associated with the operation of the various applications or functional entities described below.

The components executed on the computing environment 203 can include, for example, a management service 212, an application selection service 124, a sandboxed environment 130 as well as other applications, services, processes, systems, engines, or functionality not discussed in detail herein. The management service 212 can oversee the operation of multiple client devices 103. In some examples, an enterprise, such as one or more companies or other organizations, can operate the management service 212 to oversee or manage the operation of the client devices 103 of its employees, contractors, customers, or other users having user accounts with the enterprise.

The management service 212 can cause various software components to be installed on a client device 103 or the management service can interact with various software components that are separately installed on the client device 103. Such software components can include, for example, client applications 215, native applications 115, resources, libraries, drivers, device configurations and profiles, or other similar components that require installation on the client device 103 as specified by an administrator of the management service 212. The management service 212 can further cause policies to be implemented on a client device 103. Policies can include, for example, restrictions or permissions pertaining to capabilities of a client device 103 such that access to enterprise data 218 is secured on the client device 103.

The management service 212 can interact with one or more client applications 215 executed on the client device 103 to perform management functions. In one example, the management service 212 can interact with a telemetry component 221 on a client device 103 associated with an end user to enroll the client device 103 with the management service 212. The telemetry component 221 can be installed when the client device 103 is enrolled as a managed device with the management service 212. When enrolled, the telemetry component 221 can be registered as a device administrator of the client device 103, which can provide the telemetry component 221 with sufficient privileges to control the operation of the client device 103. In one example, the telemetry component 221 can be registered as the device administrator through the installation of a management profile at the operating system of the client device 103 that causes the operating system to designate the telemetry component 221 as the device administrator.

The management service 212 can direct the telemetry component 221 to perform device management functions on the client device 103. For example, the management service 212 can direct the telemetry component 221 to control access to certain software or hardware functions available on the client device 103. As a result, the management service 212 can verify that the configuration and operation of the client device 103 is in conformance with predefined criteria that ensures that enterprise data 218, or other data, is protected from data loss, unauthorized access, or other harmful events.

The management service 212 can further provision enterprise data 218 to the client device 103 through the telemetry component 221 or the client application 215. In one example, the management service 212 can cause the telemetry component 221 or the client application 215 to control use of the client device 103 or provision enterprise data 218 to the client device 103 through use of a command queue provided by the management service 212. In some examples, the management service 212 can store commands in a command queue associated with a particular client device 103 and accessible by the particular client device 103.

In some examples, the management service 212 can transmit an instruction to an original equipment manufacturer (OEM) messaging service specific to the client devices 103 to cause the OEM specific messaging service to send an instruction to the operating systems of the client device 103, which causes the client device 103 to retrieve commands from the command queues provided by the management service 212. In other examples, the telemetry component 221 is executed by such client device 103 to retrieve the contents of the command queue. In one example, the telemetry component 221 or the client application 215 can retrieve the contents of the command queue on a configured interval, such as every four hours, or upon detection of a certain event, such as detection of an unauthorized application being executed by the client device 103. The management service 212 can also push commands to the telemetry component 221 or the client application 215. In any case, the telemetry component 221 or the client application 215 can receive the contents of the command queue from the management service 212.

The application selection service 124 is executed to select a version of an application that is to be launched on a client device 103 based at least in part on an overall posture or context of the client device 103 requesting to launch an application. In various examples, when a user indicates that he or she would like to launch a particular application on a client device 103, an application selection request can be generated by the client device 103 and sent to the application selection service 124 requesting for an identification of the version of the application that should be launched based at least in part on the device posture of the requesting device 103.

In various examples, upon receiving an application selection request, the application selection service 124 can determine the overall posture of the device 103 (e.g., level of trust, level of risk, level of compliance, etc.) based at least in part on user data 133, device data 136, session data 139, and/or other types of data. In various examples, the user data 133, the device data 136, and/or the session data 139 can be obtained by querying the client device 103. In some examples, the client device 103 is a managed device of an enterprise, and the telemetry component 221 installed on the client device 103 can collect and provide the user data 133, the device data 136, and/or the session data 139 to the application selection service 124. In other examples, the user data 133, the device data 136, and/or the session data 139 are stored in the data store 141 associated with the enterprise and are obtained by accessing the data store 141.

According to various examples, the application selection service 124 determines the posture level and selects an appropriate version of the application for the client device 103 to launch based at least in part on the posture level. In some examples, the level of risk is based on a score that is generated to reflect the posture level (e.g., a sum of weights assigned to factors associated with the user data, device data, and/or session data). In this example, a version of the application may be selected when the score is within a predefined threshold range assigned to a given version. In other examples, a version of the application is selected based at least in part on an explicit presence or absence of context attributes. As such, the version of the application is selected based at least in part on whether certain attributes are present. Upon determining a version of the application to launch, the application selection service 124 can notify the client device 103 and the client device 103 can proceed with launching the appropriate version of the application. In various examples, the user may be notified why a particular version of an application was launched.

The sandboxed environment 130 may be executed to provide a protected environment for execution of an application instance of the virtualized application 127. In various examples, the sandboxed environment 130 can correspond to an execution environment that restricts application access to data and/or system services. In some examples, a user interacting with the virtualized application 127 within the sandboxed environment 130 can be restricted from copying, pasting, or editing data associated with the application. In some examples, a user interacting the virtualized application 127 within the sandboxed environment 130 can be prevented from taking screenshots of the data accessed in the application. It should be noted that the set forth limitations are merely examples of restrictions that can be applied to the virtualized application 127 and that limitations can comprise any sort of restrictions or data access restrictions as defined by an administrator of the enterprise managing and/or monitoring the client device 103. In addition, it should be noted that the sandboxed environment 130 can be executed by the management service 212 or application selection service 124 in the computing environment 203 or by a client application 215 in the client device 103.

The data stored in the data store 141 can include, for example, enterprise data 218, device data 136, user data 133, session data 139, application selection rules 224, as well as other data. Enterprise data 218 includes data associated with the enterprise and/or other data that is accessible to the client device 103 and provided. The enterprise data 218 can include files that can include images, videos, email, corporate documents, social media, messages, enterprise applications, confidential documents, a spreadsheet, a word processing document, or other enterprise content or communications. Although the enterprise data 218 is illustrated as being a component of the data store 141 of the computing environment 103, in some examples, one or more sets of enterprise data 218 can be stored by other tools and/or systems (e.g., OneDrive®, local hard disk, Dropbox®, etc.) that are accessible by the client device 103 and/or the computing environment 103. For example, an end user that is enrolled and authenticated with the management service 212 can access the enterprise data 218 using the client application 215 or telemetry component 221. However, if an end user is no longer enrolled in the management service 212 or an authentication of the end user fails, the management service 212 can restrict access by the client application 215 or the telemetry component 221 to the enterprise data 218. However, it should be noted that in some examples, the client device 103 is not a managed device in an enterprise but is rather a monitored device by an enterprise or organization. As such, in the case of a monitored device that is not managed, enterprise data 218 may still be accessible.

The device data 136 can include information about the client device 103. The device data 136 can include, for example, information specifying applications that are installed on the client device 103, configurations or settings that are applied to the client device 103, user accounts associated with the device 103, the physical location of the client device 103, the enterprise associated with the client device 103, the network to which the client device 103 is connected, the device group(s) to which the client device 103 belongs, an operating system installed on the client device 103, version information associated with the applications and/or operating system installed o the client device 103, a device type, a device management status, and/or other information associated with the client device 103.

The user data 133 can include information pertaining to end user of the client devices 103 enrolled with the management service 212. For instance, the user data 133 can include data used to authenticate an end user, such as a user name, password, email address, biometric data, device identifier, registry identifier, or other data. Additionally, the user data 133 can include other information associated with an end user, such as name, a role of the user within an organization, permissions for accessing enterprise data 218, an organization unit, type of user authentication, strength of user authentication, or other information.

The session data 139 can include information pertaining to a session associated with the client device 103 requesting to launch an application. A session corresponds to a period of time in which a user interacts with an application. In various examples, the session data 139 includes information that is known at the time the user/device attempts to launch the application as well as the data that is generated during the application use. In various examples, the session data 139 can include the user data 133, the device data 136, a time of day, a day of a week, a type of application being requested to launch, a type of network connection, a network status, and/or other features.

The application selection rules 224 include rules, models, and/or configuration data for the various algorithms or approaches employed by the application selection service 124 for determining a posture level associated with a device 103 requesting to launch an application and for selecting a version of an application for the client device 103 to launch based at least in part on the posture level. For example, the application selection rules 224 can include weights to assign to various factors in the device data 136, user data 133, and/or session data 139 in determining a level of risk. In various examples, a score corresponding to a posture level can be calculated based at least in part on the weights. The application selection rules 224 can include predefined thresholds associated with each of the different version of applications such that the application selection service 123 selects the version of the application for the client device 103 to launch when a calculated score is within a predefined threshold associated with a given application versions.

In some examples, the application selection rules 224 includes attributes that are required for a given application version to be selected. For example, a version of the application can be selected based at least in part on an explicit presence or absence of context attributes. For example, a version of an application may only be selected if a firewall is enabled for the device, the device is a managed device, and the user has a certain role within the enterprise. As such, the version of the application is selected based at least in part on whether certain attributes are present. These attributes can be administrator defined.

In some examples, the application selection rules 224 can be based at least in part on machine learning model data 225 that include one or more machine learning models that are trained to determine a posture level associated with a given device posture based at least in part on the user data 133, the device data 136, and/or the session data 139. In various examples, the model(s) can be updated with feedback data obtained from feedback associated with a given selection. For example, if a user is provided a version of an application that is determined to give too much access to the application thereby causing a security risk to the enterprise or accessed data, the model(s) can be updated to account for the improper selection. Likewise, if a user is unable to obtain full access to a given application and it is later determined that the user should have been able to have full access to an application, the model(s) can be updated to account for the improper selection. In various examples, the feedback data is based on an administrator review of the device posture and the selected version of the application.

The computing environment 206 may comprise, for example, a server computer or any other system providing computing capability. Alternatively, the computing environment 206 may employ a plurality of computing devices that are arranged, for example, in one or more server banks or computer banks or other arrangements. Such computing devices may be located in a single installation or may be distributed among many different geographical locations. For example, the computing environment 206 may include a plurality of computing devices that together may comprise a hosted computing resource, a grid computing resource, and/or any other distributed computing arrangement. In some cases, the computing environment 206 may correspond to an elastic computing resource where the allotted capacity of processing, network, storage, or other computing-related resources may vary over time.

Various applications and/or other functionality may be executed in the computing environment 206 according to various embodiments. Also, various data may be stored in a data store that is accessible to the computing environment 206. The components executed on the computing environment 206, for example, include a browser-based application 118 and other applications, services, processes, systems, engines, or functionality not discussed in detail herein. In various examples, the browser-based application 118 is operated by an entity different from the enterprise associated with the computing environment 203 and is configured to be accessed via the browser 121 of the client device 103 over the network 209. The browser-based application 118 may be operated by a developer or a third party.

The client device 103 can be representative of one or more client devices 103. The client device 103 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 103 can also be equipped with networking capability or networking interfaces, including a localized networking or communication capability, such as a near-field communication (NFC) capability, radio-frequency identification (RFID) read or write capability, or other localized communication capability.

The client device 103 can execute client applications 215, the telemetry component 221, a browser 121, native application 115, a sandboxed environment 130, and other components. Some client applications 215, the telemetry component 221, the browser 121, and the native applications 115 can access network content served up by the computing environment 203 or other servers, thereby rendering a user interface 106 on a display 227, such as a liquid crystal display (LCD), touch-screen display, or other type of display device. To this end, some client applications 215 can include a browser 121 or a native application 115, and a user interface 106 can include a network page, an application screen, or other interface. Further, the client applications 215 can include device email applications, management applications, enterprise applications, social networking applications, word processors, spreadsheet applications, media viewing applications, or other applications.

In various examples, the native application 115 can be written in code that runs locally on the client device 103 and provides features of the service to the user. In some examples, the native application 115 provides the full functionality of the service to the user. In other examples, the native application 115 provides a different or more limited level of functionality of the application. In various examples, the native application 115 is code that is written specifically for a given platform or device 103. The native application 115 can be installed by a user or by the enterprise managing the device.

Figure 3:
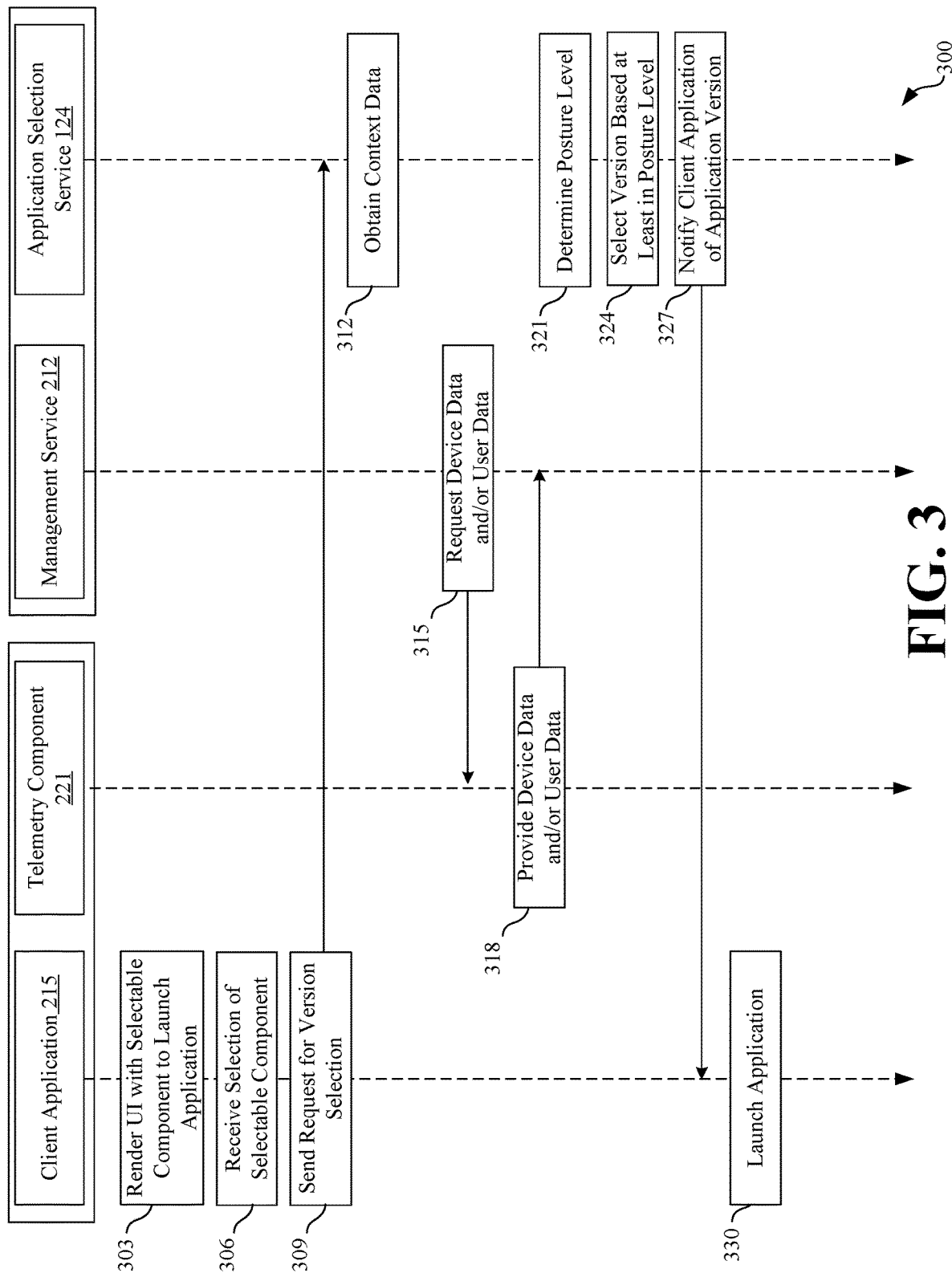
FIG. 3 is a sequence diagram depicting the operation of components of the network environment of FIG. 2.

Next, a general description of the operation of the various components of the network environment 200 is provided with reference to FIG. 3. FIG. 3 illustrates a sequence diagram 300 that provides one example of the operation of the network environment 200.

Beginning at step 303, the client application 215 renders a user interface 106 that includes at least one selectable component 109 corresponding to an application that can be launched by the client device 103. For example, the user interface 106 can include an application catalog of a listing of applications that are available to be launched by a client device 103. In other examples, the selectable component 109 is displayed independently of an application catalog. In various examples, each selectable component 109 corresponds to a particular application. In some examples, a selectable component 109 corresponds to a particular version of the application. For example, a user may select a selectable component 109 corresponding to the browser-based application 118 instead of a selectable component 109 corresponding to the native application 115 where both the browser-based application 118 and the native application 115 correspond to the same service but provide different levels of functionality and access. In other examples, the selectable component 109 is generic to the particular application but does not correspond to a particular delivery mechanism associated with the application. In some examples, a posture can be determined and the selectable components 109 associated with a given delivery mechanism of an application that are provided correspond to versions of the application that are permitted based at least in part on the posture or the expected posture.

At step 306, the client application 215 receives a selection of a particular selectable component 109. In some examples, the selectable component corresponds to a generic version of the application. In other examples, the selectable component corresponds to a particular version of the application. As such, upon receiving a user selection of the particular selectable component 109 the client application can intercept the launching of the application and generate an application selection request to determine which version of the application should be launched to provide the best overall user experience while ensuring security of the data accessible through interactions with the application and the overall enterprise managing the device 103.

At step 309, the client application 215 sends the application selection request to the application selection service 124 to determine which version of the requested application should be launched. In various examples, the application selection request can include an identifier that identifies the application being requested to launch. It should be noted that although FIG. 2 illustrates the application selection service 124 as part of the computing environment 203, in various examples, the application selection service 124 can be executed locally on the client device 103. Accordingly, when the application selection service 124 is executed by the computing environment 203, the client application 215 can send the application selection request to the application selection service 124 over the network 209 to the computing environment 203. When the application selection service 124 is executed by the client device 103, the client application 215 can send the application selection request directly to the application selection service 124.

At step 312, the application selection service 124 obtains context data to determine the overall posture of the requesting client device 103. In various examples, the context data includes the user data 133, the device data 136, the session data 139, and/or machine learning model data 225. As previously discussed, the user data 133 can include a user job profile, an organization group, user permissions for accessing data, an organization title, changes in observed behavior of the user, and/or other data. The device data 136 can include, for example, a device location (e.g., physical, logical), a device management status, an operating system version, one or more device security settings, a device type, a device status, a list of installed applications, a type of network connection associated with the client device and/or other data. The session data 139 can include information pertaining to a session associated with the client device 103 requesting to launch an application. In various examples, the session data 139 can include the user data 133, the device data 136, a time of day, a day of a week, a type of application being requested to launch, a type of network connection, a network status, and/or other data.

In some examples, the user data 133, the device data 136, and/or the session data 139 are stored in the data store 141 associated with the enterprise and are obtained by accessing the data store 141. Accordingly, the application selection service 124 obtains this corresponding data from the data store 141. In other examples, some or all of the context data can be obtained by querying the telemetry component 221 installed on the client device 103 and in communication with the management service 212 executing in the computing environment 203 as discussed at steps 315 and 318.

At step 315, the management service 212 can send a request to the telemetry component 221 installed on the client device 103 to obtain the corresponding context data. In various examples, the management service 212 can cause the telemetry component 221 or the client application 215 to provide the context data through use of a command queue provided by the management service 212. In some examples, the management service 212 can store commands in a command queue associated with a particular client device 103 and accessible by the particular client device 103. As such, the management service 212 can provide a command requesting the context data (e.g., user data 133, device data 136, session data 139). In other examples, the management service 212 can push commands to the telemetry component 221 requesting the context data. In examples where the client device 103 is unmanaged but is still monitored, the application selection service 124 or other monitoring service in the computing environment can send a request to the telemetry component 221 in a similar way as described with respect to the management service 212.

At step 318, the telemetry component 221 can collect the requested context data and provide to the management service 212 (or other requesting service) which in turn provides the requested context data to the application selection service 124 and/or stores in the data store 141.

At step 321, the application selection service 124 determines the posture level (e.g., level of risk, compliance application) associated with the overall posture (e.g., context) of the device and user requesting to launch an application. In some examples, the posture level is based on a score that is generated to reflect the posture level (e.g., a sum of weights assigned to factors associated with the user data, device data, session data, machine learning model data, etc.). In this example, a version of the application may be selected when the score is within a predefined threshold range assigned to a given version and defined in the application selection rules 224. For example, the application selection service 124 can analyze the user data 133, device data 136, session data 139, and/or machine learning model data 225, and assign weights defined in the application selection rules 224 to various factors. The application selection service 124 (or other component) generates a score using the assigned weights (e.g., a sum of the weights). The score can represent the posture level associated with the overall posture or context.

In various examples, the application selection rules 224 can include predefined threshold ranges associated with each version of the application that can be launched. For example, the web version may require that a posture level be less than 10 when the score is based on a scale of 0-100. As such, the web version will be permitted to be launched if the generated score is less than a value of 10.

In other examples, a version of the application is selected based at least in part on an explicit presence or absence of context attributes. For example, a posture level can be determined based at least in part on whether certain attributes are associated with the given context. For example, an overall posture may be considered low risk if the device is managed, firewall is enabled, disk encryption is enabled for internal disks, a passcode is set, the operating system meets certain requirements, the user is at a trusted network location, there has been a successful response to a multi-factor authentication challenge, and/or other features. However, the overall posture may be considered high risk if the device is not managed, the firewall is disabled, and the location of the device is untrustworthy. In various embodiments, the attributes and the posture levels (e.g., levels of risk) for the different versions of the applications can be administrator defined.

In some examples, the application selection service 124 or other component inputs the context data into one or more machine learning models that are trained to output a posture level associated with the given context based at least in part on the attributes included or excluded from the context data.

At step 324, the application selection service 124 selects a version of the application for the client device 103 to launch based at least in part on the posture level. For example, the application selection rules 224 can define a posture level for each version available for a given application. For example, a web version (e.g., browser-based application 118) may be selected when the posture level is considered to be low based at least in part on the risk score, attributes present, and/or model output. Similarly, a virtualized version (e.g., virtualized application 127) may be selected when the posture level is considered to be high based at least in part on the risk score, attributes present, and/or model output. For example, if a risk score is calculated and the application selection rules 224 indicate a value range for each of the versions of the application, the version of the application assigned a value range that corresponds to the risk score will be selected. In some examples, the application selection service 124 can determine that there is not a version of delivery mechanism available to select based on the posture level (e.g., level of risk, compliance evaluation) associated with the request to launch an application.

At step 327, the application selection service 124 notifies the client application 215 of the version of the application selected to launch. For example, the application selection service 124 can identify whether the client device 103 should launch the browser-based application 118, the native application 115, or the virtualized application 127 in response to the user selecting the selectable component 109 associated with the application. In some examples, the application selection service 124 generates a notification indicating why a particular version was selected. In some examples, the notification can further identify what the user could change with the context in order to gain access to a less limiting version of the application. For example, if the device does not have a firewall enabled, the notification may indicate that enabling the firewall would provide access to a less limiting version of the application. In the situation where the application selection service 124 did not select a version of the application to launch, the application selection service 124 can notify the client application 214 that the application cannot be launched.

At step 330, the client application 215 causes the client device 103 to launch the selected version of the application when a version of the application is selected. For example, if the web version of the application was selected, the client application 215 can initiate the browser 121 to provide access to the browser-based application 118 in the computing environment 206. Similarly, if the native version of the application was selected, the client application 215 can cause the client device 103 to launch the native application 115 associated with the application and installed on the client device 103. Further, if the virtualized version of the application was selected, the client application 215 can initiate the sandboxed environment 130 within the computing environment 203 or within the client device 103 to provide access to the virtualized application 127 with controls defined by an administrator of the enterprise. Thereafter, this portion of the operation proceeds to completion.

The sequence diagram of FIG. 3 shows examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram of FIG. 3 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the computing devices or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions on an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system, comprising:
a computing device including one or more processors configured to execute a plurality of management applications in the computing device, the plurality of management applications including a client application and an application selection service application, wherein, when executed, the plurality of management applications causes the computing device to at least:
in response to a user selection of a selectable component corresponding to a particular version of an application that specifies a particular delivery mechanism of the application, on a user interface rendered by the client application, intercept launching of the particular version of the application by the client application and send a request to launch the application from the client application to the application selection service application executed in the computing device;
using the application selection service application executed in the computing device, determine a posture level associated with the request to launch the application, the posture level being based at least in part on user data associated with a user of the computing device and device data associated with the computing device;
using the application selection service application executed in the computing device, select a version of the application from a plurality of versions of the application that specifies different delivery mechanisms of the application, respectively, based at least in part on the posture level; and
launch the version of the application that has been selected using the application selection service application, instead of the particular version of the application that has been selected in response to the user selection.

2. The system of claim 1, wherein the user data comprises at least one of a user job profile, an organization group, user permissions for accessing data, an organization title, an authentication type, an authentication strength, or one or more changes in observed behavior of the user.

3. The system of claim 1, wherein the device data comprises at least one of a logical device location, a physical device location, a device management status, an operating system version, one or more device security settings, a device type, a device status, a list of installed applications, or a type of network connection associated with the computing device.

4. The system of claim 1, wherein individual versions of the plurality of versions provide varying levels of functionality to a user interacting with the computing device, a first version of the plurality of versions providing the user with a complete level of functionality and a second version of the plurality of versions providing the user with a limited level of functionality.

5. The system of claim 1, wherein a first version of the plurality of versions comprises a browser-based application, a second version of the plurality of versions comprises a native application, and a third version of the plurality of versions comprises a virtualized application.

6. The system of claim 1, wherein, when executed, the plurality of management applications further causes the computing device to at least:
generate a notification indicating i) a reason for the version of the application that has been selected using the application selection service application being launched, and ii) one or more features of the computing device that need to be enabled to launch another version of the application; and
cause the computing device to render the notification.

7. A method, comprising:
in response to a user selection of a selectable component corresponding to a particular version of an application that specifies a particular delivery mechanism of the application, on a user interface rendered by a client application executed on the computing device, intercepting launching of the particular version of the application by the client application and sending a request to launch the application from the client application to an application selection service application executed in the computing device;
determining, by the application selection service application executed in the computing device, a posture level associated with the request to launch the application, the posture level being based at least in part on user data associated with a user of the computing device and device data associated with the computing device;
selecting, by the application selection service application executed in the computing device, a version of the application from a plurality of versions of the application that specifies different delivery mechanisms of the application, respectively, based at least in part on the posture level; and
instructing, by the client application executed in the computing device, the computing device to launch the version of the application that has been selected by the application selection service application, instead of the particular version of the application that has been selected in response to the user selection.

8. The method of claim 7, wherein the user data comprises at least one of a user job profile, an organization group, user permissions for accessing data, an organization title, an authentication type, an authentication strength, or one or more changes in observed behavior of the user.

9. The method of claim 7, wherein the device data comprises at least one of a logical device location, a physical device location, a device management status, an operating system version, one or more device security settings, a device type, a device status, a list of installed applications, or a type of network connection associated with the computing device.

10. The method of claim 7, wherein individual versions of the plurality of versions provide varying levels of functionality to a user interacting with the computing device, a first version of the plurality of versions providing the user with a complete level of functionality and a second version of the plurality of versions providing the user with a limited level of functionality.

11. The method of claim 7, wherein a first version of the plurality of versions comprises a browser-based application, a second version of the plurality of versions comprises a native application, and a third version of the plurality of versions comprises a virtualized application.

12. The method of claim 7, further comprising:
generating a notification indicating i) a reason for the version of the application that has been selected using the application selection service application being launched, and ii one or more features of the computing device that need to be enabled to launch another version of the application; and
causing the computing device to render the notification.

13. A non-transitory computer readable medium comprising machine-readable instructions that, when executed by a processor of a computing device, cause the computing device to at least:
in response to a user selection of a selectable component corresponding to a particular version of an application that specifies a particular delivery mechanism of the application, on a user interface rendered by the client application, intercept launching of the particular version of the application by the client application and send a request to launch the application from the client application to the application selection service application executed in the computing device;
using the application selection service application executed in the computing device, determine a posture level associated with the request to launch the application, the posture level being based at least in part on user data associated with a user of the computing device and device data associated with the computing device;
using the application selection service application executed in the computing device, select a version of the application from a plurality of versions of the application that specifies different delivery mechanisms of the application, respectively, based at least in part on the posture level; and
instruct the computing device to launch the version of the application that has been selected using the application selection service application, instead of the particular version of the application that has been selected in response to the user selection.

14. The non-transitory computer readable medium of claim 13, wherein the user data comprises at least one of a user job profile, an organization group, user permissions for accessing data, an organization title, an authentication type, an authentication strength, or one or more changes in observed behavior of the user.

15. The non-transitory computer readable medium of claim 13, wherein the device data comprises at least one of a logical device location, a physical device location, a device management status, an operating system version, one or more device security settings, a device type, a device status, a list of installed applications, or a type of network connection associated with the computing device.

16. The non-transitory computer readable medium of claim 13, wherein individual versions of the plurality of versions provide varying levels of functionality to a user interacting with the computing device, a first version of the plurality of versions providing the user with a complete level of functionality and a second version of the plurality of versions providing the user with a limited level of functionality.

17. The non-transitory computer readable medium of claim 13, wherein a first version of the plurality of versions comprises a browser-based application, a second version of the plurality of versions comprises a native application, and a third version of the plurality of versions comprises a virtualized application.

18. The non-transitory computer readable medium of claim 13, wherein when executed, the machine-readable instructions further cause the computing device to at least:
generate a notification indicating i) a reason for the version of the application that has been selected using the application selection service application being launched, and ii) one or more features of the computing device that need to be enabled to launch another version of the application; and
cause the computing device to render the notification.

* * * * *